US008671755B2

(12) United States Patent
Sato

(10) Patent No.: US 8,671,755 B2
(45) Date of Patent: *Mar. 18, 2014

(54) ANGULAR VELOCITY DETECTION CIRCUIT AND ANGULAR VELOCITY DETECTION APPARATUS

(71) Applicant: Seiko Epson Corporation, Tokyo (JP)

(72) Inventor: Kenji Sato, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/676,679

(22) Filed: Nov. 14, 2012

(65) Prior Publication Data

US 2013/0069621 A1    Mar. 21, 2013

Related U.S. Application Data

(63) Continuation of application No. 12/504,123, filed on Jul. 16, 2009, now Pat. No. 8,327,703.

(30) Foreign Application Priority Data

Jul. 17, 2008   (JP) .................................. 2008-186138

(51) Int. Cl.
   *G01C 19/56*   (2012.01)
   *G01P 3/44*    (2006.01)
   *G01P 3/00*    (2006.01)

(52) U.S. Cl.
   USPC ................. 73/504.12; 73/504.16; 73/497

(58) Field of Classification Search
   USPC ................ 73/497, 504.12, 504.14, 504.16, 73/504.04, 1.37, 1.38, 1.77, 1.78
   See application file for complete search history.

(56) References Cited

U.S. PATENT DOCUMENTS

| 5,349,856 | A  | 9/1994  | Nakamura        |
| 5,585,562 | A  | 12/1996 | Kurata et al.   |
| 5,635,642 | A  | 6/1997  | Nonomura et al. |
| 6,497,146 | B1 | 12/2002 | Hobbs et al.    |
| 7,033,071 | B2 | 4/2006  | Otsuka          |
| 7,069,783 | B2 | 7/2006  | Uehara          |
| 7,140,249 | B2 | 11/2006 | Matsunaga et al.|

(Continued)

FOREIGN PATENT DOCUMENTS

| JP | A-06-160100 | 6/1994 |
| JP | A-07-091957 | 4/1995 |

(Continued)

OTHER PUBLICATIONS

Jul. 24, 2013 Office Action issued in U.S. Appl. No. 13/672,214.

*Primary Examiner* — Helen Kwok

(74) *Attorney, Agent, or Firm* — Oliff PLC

(57) ABSTRACT

An angular velocity detection circuit is connected to a resonator for making excited vibration on the basis of a drive signal and detects an angular velocity. The angular velocity detection circuit includes: a self-vibration component extraction unit that receives, from the resonator, a detection signal including an angular velocity component based on a Coriolis force and a self-vibration component based on the excited vibration of the resonator and extracts the self-vibration component from the detection signal; a direct-current conversion unit including an integration unit that integrates an output signal of the self-vibration component extraction unit; and an offset addition unit that adds an offset value to an output signal of the direct-current conversion unit.

20 Claims, 8 Drawing Sheets

(56) References Cited

U.S. PATENT DOCUMENTS

| | | |
|---|---|---|
| 7,237,169 B2 | 6/2007 | Smith |
| 7,370,531 B2 | 5/2008 | Yokoi et al. |
| 7,434,466 B2 | 10/2008 | Ito |
| 8,327,703 B2 * | 12/2012 | Sato ............................ 73/504.12 |
| 8,327,704 B2 * | 12/2012 | Sato ............................ 73/504.12 |
| 2003/0056590 A1 | 3/2003 | Yanagisawa et al. |
| 2004/0173022 A1 | 9/2004 | Nozoe et al. |
| 2005/0204813 A1 | 9/2005 | Yokoi et al. |
| 2010/0011834 A1 | 1/2010 | Sato |
| 2010/0011858 A1 | 1/2010 | Sato |
| 2013/0061680 A1 * | 3/2013 | Sato ................................ 73/662 |

FOREIGN PATENT DOCUMENTS

| | | |
|---|---|---|
| JP | A-09-159459 | 6/1997 |
| JP | A-2000-171257 | 6/2000 |
| JP | A-2007-255890 | 10/2007 |
| JP | A-2008-209182 | 9/2008 |
| WO | WO 2005/006939 A2 | 1/2005 |
| WO | WO 2005/068939 A1 | 7/2005 |

* cited by examiner

ANGULAR VELOCITY DETECTION CIRCUIT AND ANGULAR VELOCITY DETECTION APPARATUS

This is a Continuation of application Ser. No. 12/504,123 filed Jul. 16, 2009, which claims the benefit of Japanese Application No. 2008-186138 filed Jul. 17, 2008. The disclosure of the prior applications is hereby incorporated by reference herein in its entirety.

BACKGROUND

1. Technical Field

The present invention relates to an angular velocity detection circuit and an angular velocity detection apparatus.

2. Related Art

There have been widely used angular velocity detection apparatuses for detecting an angular velocity using a Coriolis force that works on a resonator. Also, in recent years, there have been developed angular velocity detection apparatuses that are allowed to detect an own failure using a self-vibration component based on excited vibration of a resonator (see JP-A-2000-171257).

The amplitude of a self-vibration component based on excited-vibration varies among resonators. Therefore, unless failure determination conditions are changed for each angular velocity detection apparatus, it is difficult for related-art angular velocity detection apparatuses to make a failure determination with high accuracy.

SUMMARY

An advantage of the invention is to provide an angular velocity detection circuit and an angular velocity detection apparatus that are allowed to detect a failure of a resonator with high accuracy.

An angular velocity detection circuit according to a first aspect of the invention is an angular velocity detection apparatus that is connected to a resonator for making excited vibration on the basis of a drive signal and detects an angular velocity. The angular velocity detection circuit includes: a self-vibration component extraction unit that receives, from the resonator, a detection signal including an angular velocity component based on a Coriolis force and a self-vibration component based on the excited vibration of the resonator and extracts the self-vibration component from the detection signal; a direct-current conversion unit including an integration unit that integrates an output signal of the self-vibration component extraction unit; and an offset addition unit that adds an offset value to an output signal of the direct-current conversion unit.

The offset value may be any values including a positive value, a negative value, and zero.

By adopting the first aspect of the invention, the offset addition unit is provided. Thus, the variations among resonators in the magnitude of a self-vibration component based on excited vibration are compensated for. As a result, an angular velocity detection circuit that is allowed to detect a failure of a resonator with high accuracy without having to change failure determination conditions for each angular velocity detection apparatus is realized.

The angular velocity detection circuit according to the first aspect of the invention may further include a storage unit that stores the offset value. In this case, the offset addition unit may add the offset value stored in the storage unit to the output signal of the direct-current conversion unit.

An angular velocity detection circuit according to a second aspect of the invention is an angular velocity detection apparatus that is connected to a resonator for making excited vibration on the basis of a drive signal and detects an angular velocity. The angular velocity detection circuit includes: a self-vibration component extraction unit that receives, from the resonator, a detection signal including an angular velocity component based on a Coriolis force and a self-vibration component based on the excited vibration of the resonator and extracts the self-vibration component from the detection signal; a direct-current conversion unit including an integration unit that integrates an output signal of the self-vibration component extraction unit; and an offset input unit that adds an offset value to an output signal of the self-vibration component extraction unit.

In the angular velocity detection circuit according to the second aspect of the invention, the self-vibration component extraction unit may include an inverting unit that inverts a synchronized signal and outputs a resultant inverted signal and a switch for alternately selecting and outputting the synchronized signal and the inverted signal. The offset value may be added to one of the synchronized signal and the inverted signal.

The angular velocity detection circuit according to the first aspect of the invention may further include an own failure determination unit that determines whether there is a failure in an angular velocity detection apparatus, on the basis of an output signal of one of the offset addition unit and the direct-current conversion unit.

The angular velocity detection circuit according to the first aspect of the invention may further include an output terminal for outputting an output signal of one of the offset addition unit and the direct-current conversion unit.

An angular velocity detection apparatus according to a third aspect of the invention includes: a resonator that makes excited vibration on the basis of a drive signal, obtains a Coriolis force caused by a rotation movement and the excited vibration, and outputs a detection signal including an angular velocity component based on the Coriolis force and a self-vibration component based on the excited vibration; and an angular velocity detection circuit that is connected to the resonator and detects an angular velocity. The angular velocity detection circuit includes: a self-vibration component extraction unit that receives the detection signal and extracts the self-vibration component from the detection signal; a direct-current conversion unit including an integration unit that integrates an output signal of the self-vibration component extraction unit; and an offset addition unit that adds an offset value to an output signal of the direct-current conversion unit.

An angular velocity detection apparatus according to a fourth aspect of the invention includes: a resonator that makes excited vibration on the basis of a drive signal, obtains a Coriolis force caused by a rotation movement and the excited vibration, and outputs a detection signal including an angular velocity component based on the Coriolis force and a self-vibration component based on the excited vibration; and an angular velocity detection circuit that is connected to the resonator and detects an angular velocity. The angular velocity detection circuit includes: a self-vibration component extraction unit that receives the detection signal and extracts the self-vibration component from the detection signal; a direct-current conversion unit including an integration unit that integrates an output signal of the self-vibration component extraction unit; and an offset input unit that adds an offset value to an output signal of the self-vibration component extraction unit.

BRIEF DESCRIPTION OF THE DRAWINGS

The invention will be described with reference to the accompanying drawings, wherein like reference numerals represent like elements.

DESCRIPTION OF EXEMPLARY EMBODIMENT

Now, a preferred embodiment of the invention will be described in detail with reference to the accompanying drawings. Note that the embodiment described below does not unduly limit the invention as set forth in the appended claims. Also, not all the configurations described in the embodiment are essential configuration requirements of the invention.

1. Angular Velocity Detection Apparatus

Figure 1:
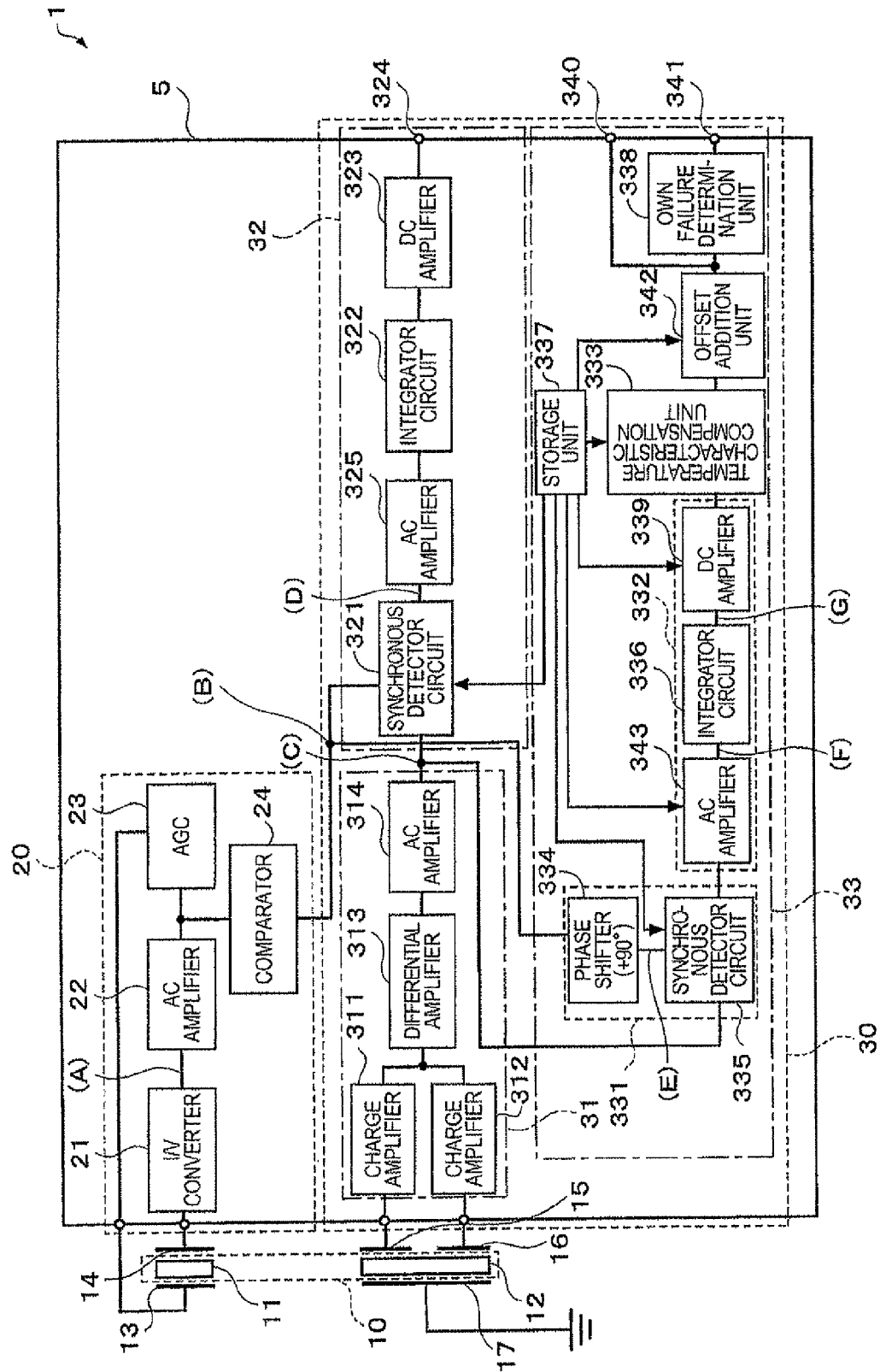
FIG. 1 is a circuit block diagram showing an example of an angular velocity detection apparatus according to an embodiment of the invention.
Figure 2:
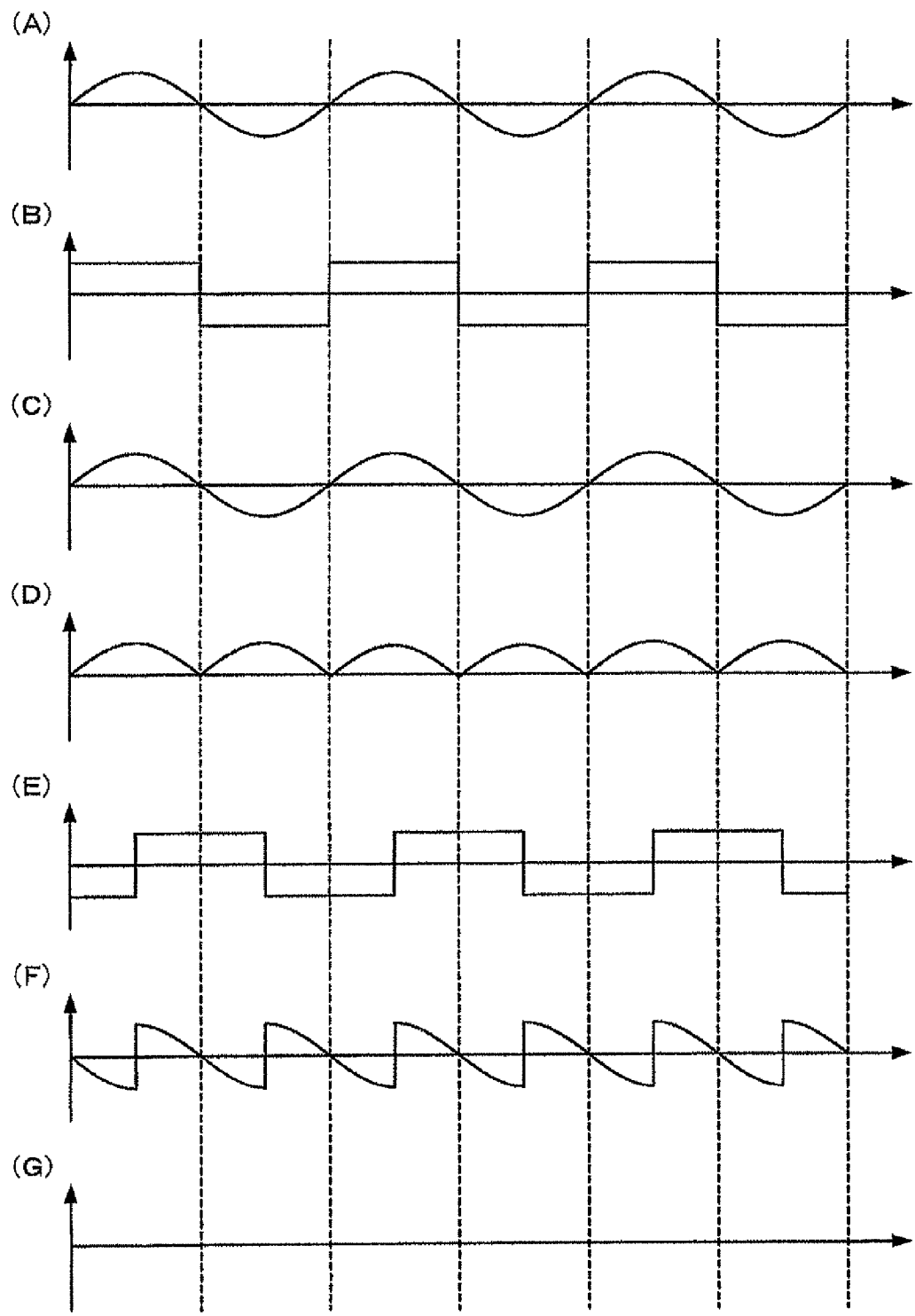
FIGS. 2A to 2G are timing charts in a case where attention is focused on an angular velocity component of a detection signal.
Figure 3:
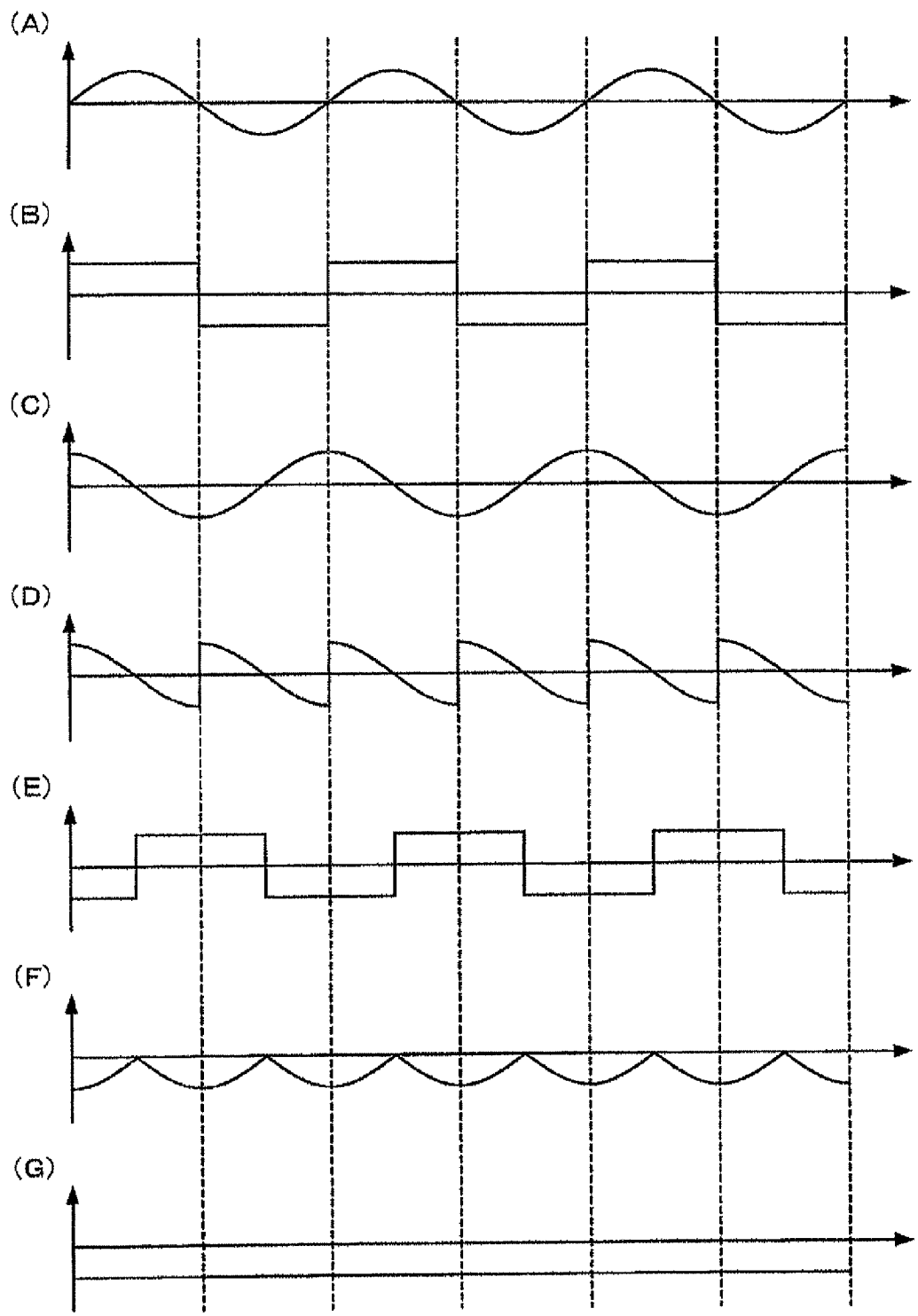
FIGS. 3A to 3G are timing charts in a case where attention is focused on a self-vibration component of a detection signal.

FIG. 1 is a circuit block diagram showing an example of an angular velocity detection apparatus according to this embodiment.

An angular velocity detection apparatus 1 according to this embodiment includes an angular velocity detection circuit 5 and a resonator 10, and the angular velocity detection circuit 5 includes a drive circuit 20 and a detection circuit 30. The drive circuit 20 and detection circuit 30 may be formed on a single substrate.

2. Resonator

The resonator 10 becomes excited and vibrates on the basis of drive signals inputted via drive vibration terminals 13 and 14. When an angular velocity movement works on the resonator while the resonator is excited and vibrates, the resonator obtains the Coriolis force. Then, the resonator 10 outputs a detection signal including an angular velocity component based on the Coriolis force and an excited-vibration component based on the excited vibration. Here, the excited-vibration component is 90° out of phase with the angular velocity component based on the Coriolis force.

Next, an example of the resonator 10 formed of a thin plate made of a piezoelectric material such as a quartz crystal will be described with reference to FIGS. 7 and 8. In the resonator 10, drive resonating arms 11 (drive resonator elements in a broad sense) extend from driving base portions 44 in the Y-axis direction of the quartz crystal. The driving base portions 44 are coupled to a detection base portion 49 via coupling arms 45 extending in the X-axis direction of the quartz crystal. Detection resonating arms 12 (detection resonator elements in a broad sense) extend from the detection base portion 49 in the Y-axis direction.

When a drive signal formed by an alternating voltage or an alternating current is applied between a drive electrode 41 on the side surface of each driving resonating arm 11 and a drive electrode 42 on the upper surface thereof, the drive resonating arms 11 make bending vibration due to a piezoelectric effect as shown by arrows B. Then, the resonator 10 makes rotation movement using the Z axis of the quartz crystal as a rotation axis as shown in FIG. 8 and thus the drive resonating arms 11 obtain the Coriolis force in a direction orthogonal to both the direction of the bending vibration shown by the arrows B and the direction of the Z axis. As a result, the coupling arms 45 vibrate as shown in arrows C. Then, the detection resonating arms 12 make bending vibration as shown by arrows D together with the coupling arms 45 in conjunction with the vibration (arrows C) of the coupling arms 45.

Also, the vibration of the drive resonating arms 11 is transmitted to the drive base portions 44, coupling arms 45, and detection base portion 49, thereby causing leakage vibration in the detection resonating arms 12. While this leakage vibration is bending vibration shown by the arrows D like the vibration based on the Coriolis force, it is 90° out of phase with the vibration based on the Coriolis force.

These different types of bending vibration cause an inverse piezoelectric effect, which in turn causes an alternating voltage or an alternating current between the detection electrode 47 on the side surface of each detection resonating arm and detection electrode 46 on the upper surface thereof. One of the detection electrode 47 and detection electrode 46 is connected to a ground terminal 17 and the other is connected to detection terminals 15 and 16. Thus, detection signals outputted to the detection terminals 15 and 16 include an angular velocity component based on the Coriolis force and a leakage component (self-vibration component) based on the excited vibration due to the drive vibration.

Figure 7:
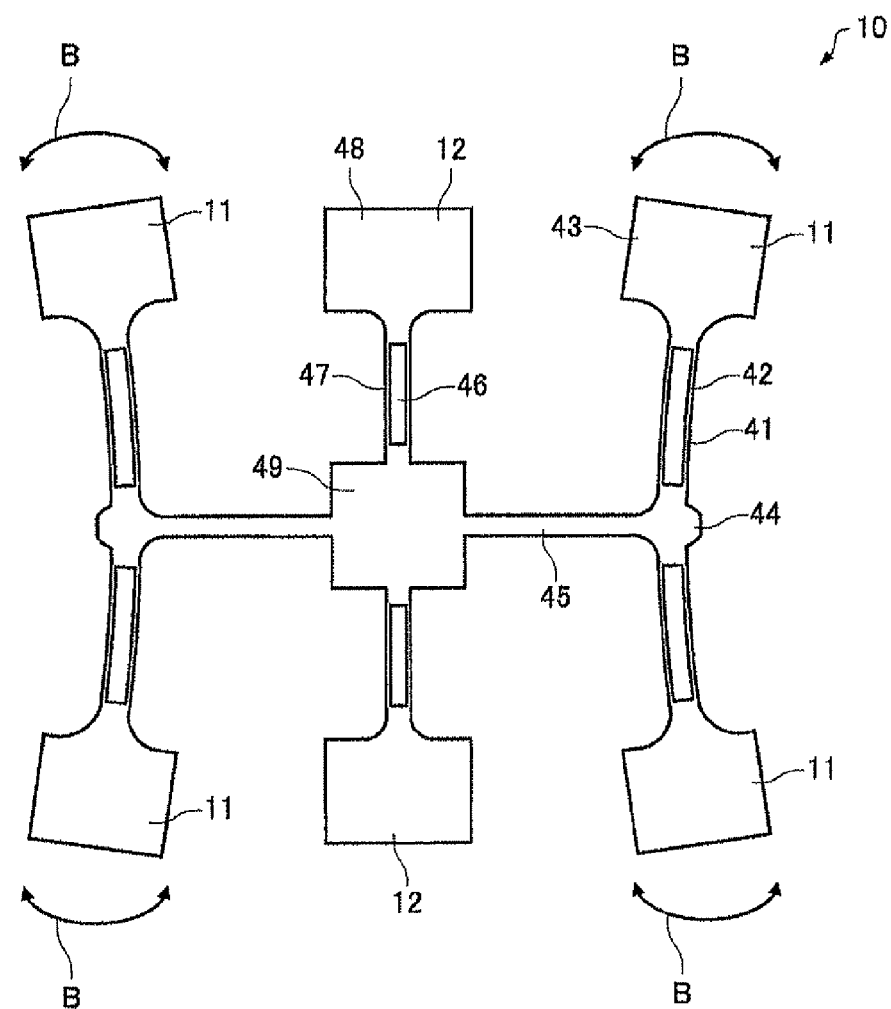
FIG. 7 is a plan view showing an example of a resonator.
Figure 8:
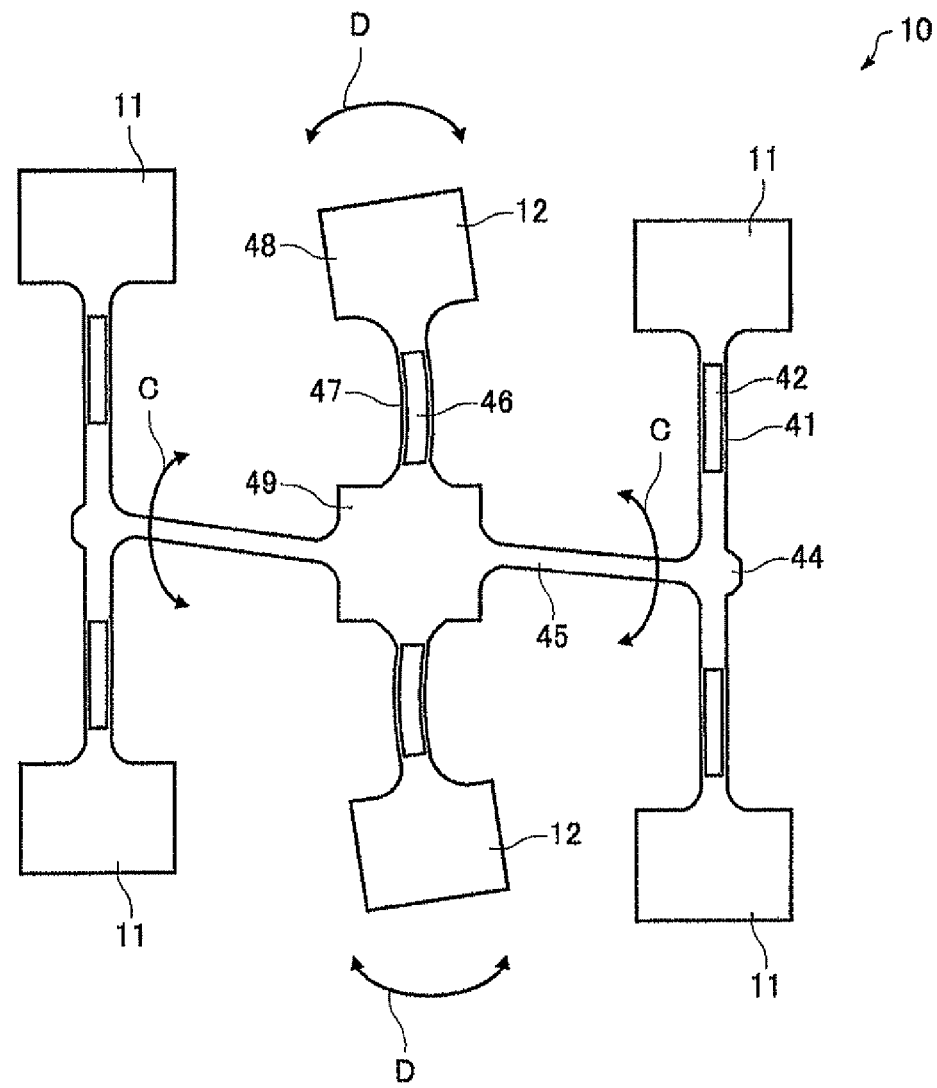
FIG. 8 is a plan view showing an example of a resonator.

In the configurations shown in FIGS. 7 and 8, the detection base portion 49 is disposed in the center and the detection resonating arms 12 extend from the detection base portion 49 both in +Y-axis direction and in −Y-axis direction so as to bring the resonator into good balance. Also, the coupling arms 45 extend from the detection base portion 49 both in +X-axis direction and in −X-axis direction, and the drive resonating arms 11 extend from the coupling arms both in +Y-axis direction and in −Y-axis direction.

The drive resonating arms 11 each have a wide portion 43 at an end thereof and a weight is attached to the wide portion 43 so that the Coriolis force is increased. Also, these short resonating arms can obtain a desired resonant frequency due to an effect of the weight. Similarly, the detection resonating arms 12 each have a wide portion 48 at an end thereof and a weight is attached to the wide portion 48.

The resonator 10 is not limited to the above-mentioned configuration and may have any configuration as long as it is a resonator for outputting a detection signal including an angular velocity component based on the Coriolis force and a leakage component based on excited vibration. For example, the resonator 10 may have a configuration where drive resonating arms are also used as detection arms or vice versa or may have a configuration where a piezoelectric film is formed on drive resonating arms or detection resonating arms.

3. Angular Velocity Detection Circuit

The angular velocity detection circuit includes the drive circuit 20 and detection circuit 30. The detection resonating arms 12 are provided with the detection terminals 15 and 16 and the ground terminal 17, and the detection terminals 15 and 16 are connected to the detection circuit 30. Opposite-phase detection signals are outputted from the detection terminals 15 and 16.

FIGS. 2A to 2G are timing charts in a case where attention is focused on an angular velocity component of a detection signal at points (A) to (G) in the circuit block diagram shown in FIG. 1. FIGS. 3A to 3G are timing charts in a case where attention is focused on a self-vibration component of a detection signal at points (A) to (G) in the circuit block diagram shown in FIG. 1. The lateral axis represents the time and the longitudinal axis represents the voltage.

The drive circuit 20 outputs a drive signal to drive the resonator 10 and receives a feedback signal from the resonator 10. Thus, the resonator 10 is excited. The detection circuit 30 receives a detection signal from the resonator 10 driven by the drive signal and extracts an angular velocity component based on the Coriolis force from the detection signal.

The drive circuit 20 according to this embodiment includes a current-voltage converter 21, an AC amplifier 22, an automatic gain control circuit 23, and a comparator 24.

When the drive resonating arms 11 vibrate, a current based on a piezoelectric effect is outputted from a drive terminal 14 as a feedback signal and inputted into the current-voltage converter 21. The current-voltage converter 21 outputs an alternating voltage signal having a frequency identical to the vibration frequency of the drive resonating arms 11 (FIG. 2A and FIG. 3A).

The alternating voltage signal outputted from the current-voltage converter 21 is inputted into the AC amplifier 22. The AC amplifier amplifies the inputted alternating voltage signal.

An alternating voltage signal outputted from the AC amplifier 22 is inputted into the automatic gain control circuit 23. The automatic gain control circuit 23 controls the gain so that the amplitude of the inputted alternating voltage signal is kept at a constant value and outputs the gain-controlled, alternating voltage signal to a drive terminal 13. The alternating voltage signal inputted into the drive terminal 13 drives the resonator 10.

Also, the alternating voltage signal amplified by the AC amplifier 22 is inputted into the comparator 24. The comparator 24 outputs, to the detection circuit 30, a square wave voltage signal (FIG. 2B) whose output level is changed on the basis of the result of a comparison between the alternating voltage signal and a reference voltage signal using the center of the amplitude of the alternating voltage signal as a reference voltage.

The detection circuit 30 according to this embodiment includes a detection signal amplification unit 31, an angular velocity component extraction unit 32, and a self-vibration component extraction unit 33.

The detection signal amplification unit 31 includes charge amplifiers 311 and 312, a differential amplifier 313, and an AC amplifier 314.

The charge amplifiers 311 and 312 are connected to the detection terminals 15 and 16, respectively, and receive opposite-phase detection signals. The signals that have undergone charge-voltage conversion in the charge amplifiers 311 and 312 are inputted into the differential amplifier 313. The differential amplifier 313 amplifies the difference between the output signals of the charge amplifier 311 and the charge amplifier 312. An output signal of the differential amplifier 313 is further amplified by the AC amplifier 314. Note that when the charge amplifiers 311 and 312 each perform the amplification, the phases of the respective signals advance 90'.

Incidentally, the detection signals outputted from the detection terminals 15 and 16 each include an angular velocity component based on the Coriolis force that works on the resonator 10 and a self-vibration component (leakage signal component) based on the excited vibration of the resonator 10. The angular velocity component extraction unit 32 extracts an angular velocity component from an output signal of the detection signal amplification unit 31. The self-vibration component extraction unit 33 extracts a self-vibration component from the output signal of the detection signal amplification unit 31.

The angular velocity component extraction unit 32 includes a synchronous detector circuit 321, an AC amplifier 325, an integrator circuit 322, a DC amplifier 323, and an output terminal 324. The synchronous detector circuit 321 extracts an angular velocity component by performing synchronous detection of the output signal of the detection signal amplification unit 31 on the basis of the square wave voltage signal (FIG. 2B) outputted by the comparator 24. The angular velocity component signal extracted by the synchronous detector circuit 321 is amplified by the AC amplifier 325 and integrated by the integrator circuit 322, and is then amplified by the DC amplifier 323 and outputted from the output terminal 324 as a direct-current voltage signal.

The self-vibration component extraction unit 33 includes a self-vibration component extraction unit 331, a direct-current conversion unit 332, and a temperature characteristic compensation unit 333.

The self-vibration component extraction unit 331 includes a phase shifter 334 for leading the phase by 90° and a synchronous detector circuit 335. The self-vibration component extraction unit 331 extracts a self-vibration component from the output signal of the detection signal amplification unit 31 by performing synchronous detection of the output signal on the basis of a signal obtained by leading the phase of the square wave voltage signal (FIG. 2B) outputted by the comparator 24 by 90° using the phase shifter 334.

The direct-current conversion unit 332 includes an integrator circuit 336 functioning as an integration unit that integrates an output signal of the self-vibration component extraction unit 331. The direct-current conversion unit 332 converts an output signal of the self-vibration component extraction unit 331 into a direct-current voltage signal. An AC amplifier 343 is provided before the integrator circuit 336, and a DC amplifier 339 is provided thereafter.

Operations of these circuits will be described with reference to the FIGS. 2A to 2G and FIGS. 3A to 3G. Operations in a case where attention is focused on an angular velocity component of a detection signal will be described with reference to FIGS. 2A to 2G, and operations in a case where attention is focused on a self-vibration component of the detection signal will be described with reference to FIGS. 3A to 3G. In this embodiment, it is assumed that an angular velocity component of a detection signal outputted from the detection terminal 15 is a signal having 90° phase lag from a feedback signal outputted from the drive terminal 14. Also, it is assumed that a self-vibration component of a detection signal outputted from the detection terminal 15 is a signal in phase with a feedback signal outputted from the drive terminal 14.

First, operations in a case where attention is focused on an angular velocity component of a detection signal will be described. An angular velocity component of a detection signal outputted from the detection terminal 15 undergoes charge-voltage conversion in the charge amplifier 311. At this time, the phase leads 90°. Therefore, the signal amplified by the differential amplifier 313 and AC amplifier 314 is in phase with a feedback signal shown in FIG. 2A, as shown in FIG. 2C.

When the output signal of the AC amplifier 314 undergoes synchronous detection in the synchronous detector circuit 321 on the basis of an output signal of the comparator 24 shown in FIG. 2B, an output signal of the synchronous detector circuit 321 takes a full-wave rectified waveform shown in FIG. 2D. By integrating the output signal of the synchronous detector circuit 321 in the integrator circuit 322, the angular velocity component of the detection signal is detected as a direct-current voltage. In this way, the angular velocity component of the detection signal is extracted by the angular velocity component extraction unit 32. Also, by amplifying the signal in the AC amplification circuit provided before the integrator circuit 322 and the DC amplifier 323 provided thereafter, the sensitivity is controlled.

On the other hand, when synchronous detection of an output signal of the AC amplifier 314 is performed in the synchronous detector circuit 335 on the basis of a signal (FIG. 2E) obtained by leading the phase of an output signal of the comparator 24 by 90° using the phase shifter 334, an output signal of the synchronous detector circuit 335 takes a waveform shown in FIG. 2F. By integrating the output signal of the synchronous detector circuit 335 in the integrator circuit 336, the direct-current voltage becomes zero as shown in FIG. 2G. In this way, the angular velocity component of the detection signal is eliminated by the self-vibration component extraction unit 33.

Next, operations in a case where attention is focused on a self-vibration component of a detection signal will be described. A self-vibration component of a detection signal outputted from the detection terminal 15 undergoes charge-voltage conversion in the charge amplifier 311. At this time, the phase leads 90°. Therefore, the signal amplified by the differential amplifier 313 and AC amplifier 314 is a signal having 90° phase lead from a feedback signal shown in FIG. 3A, as shown in FIG. 3C.

When synchronous detection of the output signal of the AC amplifier 314 is performed in the synchronous detector circuit 321 on the basis of an output signal of the comparator 24 shown in FIG. 3B, an output signal of the synchronous detector circuit 321 takes a waveform shown in FIG. 3D. By integrating the output signal of the synchronous detector circuit 321 in the integrator circuit 322, the direct-current voltage becomes zero. In this way, the self-vibration component of the detection signal is eliminated by the angular velocity component extraction unit 32.

On the other hand, when synchronous detection of an output signal of the AC amplifier 314 is performed by the synchronous detector circuit 335 on the basis of a signal obtained by leading the phase of a output signal of the comparator 24 shown in FIG. 3E by 90° using the phase shifter 334, an output signal of the synchronous detector circuit 335 takes a full-wave rectified waveform shown in FIG. 3F. By integrating the output signal of the synchronous detector circuit 335 in the integrator circuit 336, the output signal becomes a direct-current voltage proportional to the crest of a full-wave rectified waveform shown in FIG. 3F, as shown in FIG. 3G. In this way, the self-vibration component of the detection signal is extracted by the self-vibration component extraction unit 33.

Incidentally, when a failure occurs in the resonator 10, for example, when a foreign substance is stuck on the resonator 10 or when the resonator 10 is broken, the magnitude of the self-vibration component based on excited vibration of the resonator 10 varies. Therefore, by extracting a self-vibration component of a detection signal in the self-vibration component extraction unit 33 to monitor the magnitude of the self-vibration component of the detection signal inside or outside the resonator 10, it is determined whether there is a failure in the resonator 10. For example, when the self-vibration component of the detection signal exceeds the upper limit reference value or falls below the lower limit reference value, it may be determined that there is a failure in the resonator 10.

However, the amplitude of a self-vibration component based on excited-vibration varies among resonators. Therefore, unless failure determination conditions are changed for each angular velocity detection apparatus, it is difficult for related-art angular velocity detection apparatuses to make a failure determination with high accuracy.

For this reason, the angular velocity detection circuit 5 according to this embodiment includes the offset addition unit 342. The offset addition unit 342 adds an offset value for making an output voltage of the offset addition unit 342 a desired value, to an output signal of the direct-current conversion unit 332 and outputs the resultant signal. Thus, the variations among resonators in the amplitude of a self-vibration component based on excited vibration are compensated for so that the magnitudes of output signals are matched. As a result, an angular velocity detection circuit that is allowed to detect a failure of a resonator with increased accuracy without having to change failure determination conditions for each angular velocity detection apparatus is realized.

Also, the angular velocity detection circuit 1 may include a storage unit 337 for storing an offset value and the offset addition unit 342 may add an offset value stored in the storage unit 337 to an output signal of the direct-current conversion unit 332. The storage unit 337 may be formed, for example, by a non-volatile memory such as an EEPROM (electrically erasable and programmable read only memory). Thus, for example, an offset value that allows the output voltage of the offset addition unit 342 measured in the step of inspecting the angular velocity detection apparatus 1 to become a desired value is written into the storage unit 337. As a result, the variations among resonators in the amplitude of a self-vibration component based on excited vibration are compensated for so that the magnitudes of output signals are matched.

The angular velocity detection circuit 5 according to this embodiment may include the temperature characteristic compensation unit 333, for example, provided after the direct-current conversion unit 332. The temperature characteristic compensation unit 333 compensates for a variation due to the temperature in an output signal of the direct-current conversion unit 332. For example, the temperature characteristic compensation unit 333 compensates for variations due to the temperature in the amplitude of output signals of the direct-current conversion unit 332 so that the amplitude is kept constant. Thus, variations due to the temperature in output signals of the direct-current conversion unit 332 are compensated for and variations due to a failure therein are detected with high accuracy. As a result, an angular velocity detection circuit that is allowed to detect a failure of a resonator with increased accuracy is realized.

Figure 4:
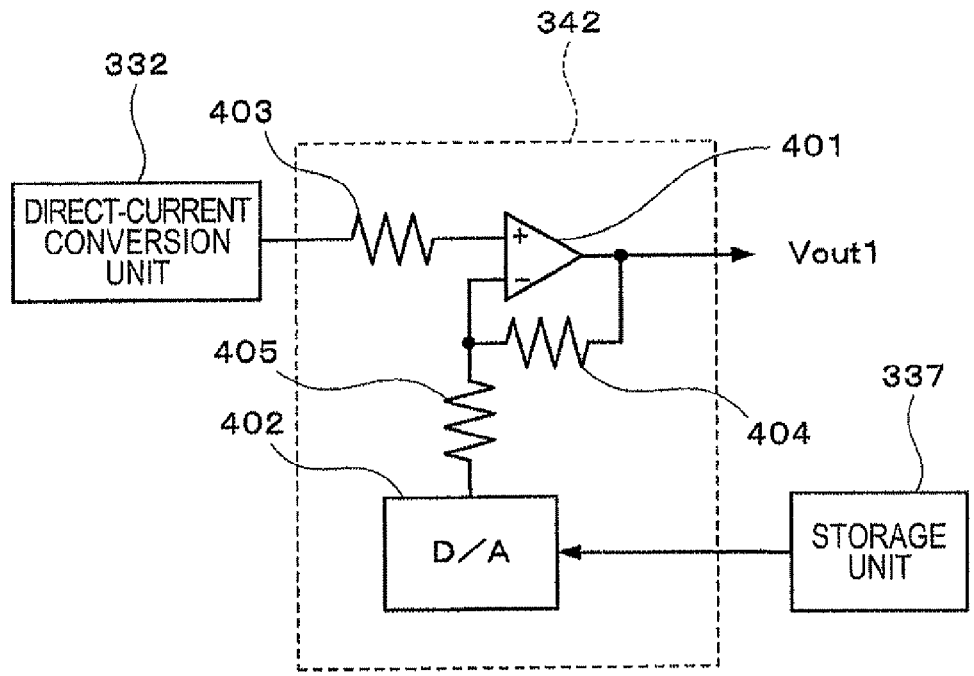
FIG. 4 is a circuit drawing showing an example of an offset addition unit.

FIG. 4 is a circuit diagram showing an example of the offset addition unit 342 applicable to the angular velocity detection apparatus 5 according to this embodiment. The offset addition unit 342 shown in FIG. 4 includes a calculation amplifier 401, a D/A converter 402, and resistances 403 to 405.

An output signal of the direct-current conversion unit 332 is inputted into a non-inverting input terminal of the calculation amplifier 401 via the resistance 403. The D/A converter 402 outputs a voltage signal on the basis of an offset value stored in the storage unit 337. The voltage signal outputted by the D/A converter 402 is inputted into an inverting input terminal of the calculation amplifier 401 via the resistance 405. The calculation amplifier 401 amplifies the difference between the signal inputted into the non-inverting input terminal and the signal inputted into the inverting input terminal and outputs the resultant voltage as an output voltage Vout1. Also, the output voltage Vout1 is fed back to the inverting input terminal of the calculation amplifier 401 via the resistance 404.

As seen above, if the offset addition unit 342 is configured as shown in FIG. 4, the output voltage Vout1 is set to a desired value by properly setting an offset value stored in the storage unit 337.

As described above, the temperature characteristic compensation unit 333 may be provided after the direct-current conversion unit 332. In this case, an output signal of the temperature characteristic compensation unit 333 is inputted into the non-inverting input terminal of the calculation amplifier 401 via the resistance 403. Other operations of the offset addition unit 342 are as described above.

Figure 9:
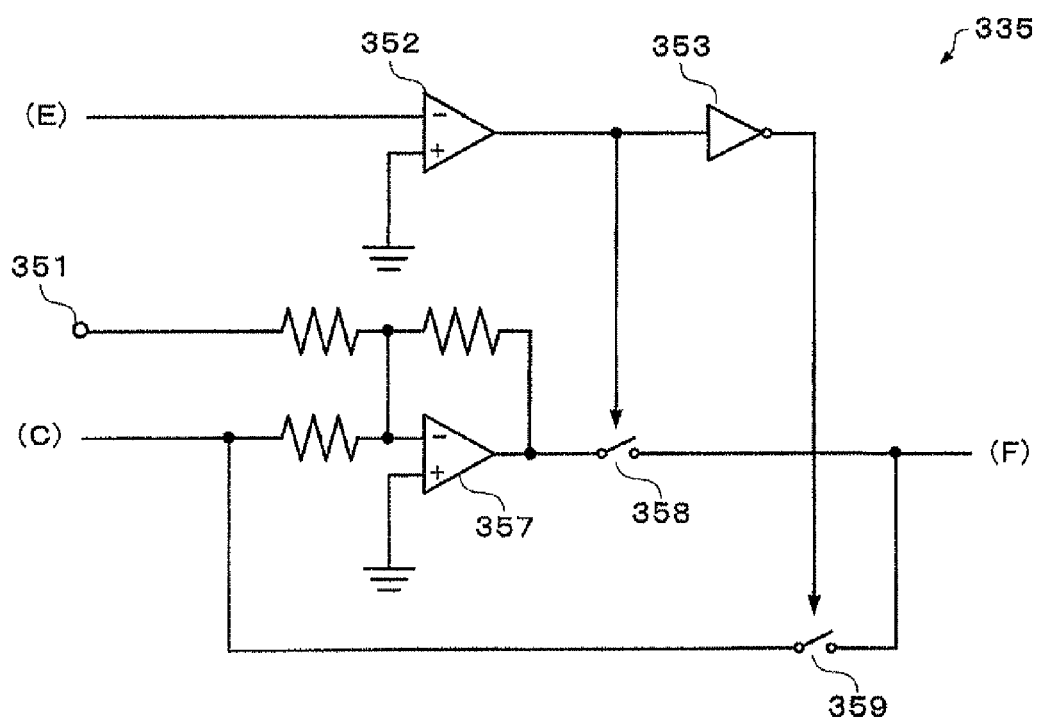
FIG. 9 is a circuit diagram showing an example of a synchronous detector circuit including an offset input unit.

Also, a synchronous detector circuit including an offset input unit that adds an offset value to an output signal of the synchronous detector circuit 335 (self-vibration extraction unit 331) as shown in FIG. 9 may be used as the synchronous detector circuit 335. In this case, a synchronized detection signal (C) is branched into two signals. One of the two signals is inputted into a switch 359 as a non-inverted signal without being inverted; the other is inverted by an inverting amplifier 357 and inputted into a switch 358. By alternately closing the switch 358 and switch 359 using a reference signal, a non-inverted signal and an inverted signal are alternately outputted. Thus, a synchronous detection signal (F) is outputted. Also, an offset signal from an offset input terminal 351 is superimposed on an inverted signal. Therefore, an offset signal is superimposed on the synchronizing detection signal (F) at the timing when the switches 358 and 359 select and output an inverted signal that is a synchronized signal; no offset signal is superimposed on the synchronizing detection signal (F) at the timing when the switches 358 and 359 select and output a non-inverted signal that is a synchronized signal. In this way, the superimposition and non-superimposition of an offset signal is repeated. Subsequently, the offset signal is smoothed by the integrator circuit 336 so that a given level of offset value is obtained. Also, an offset signal may be superimposed on a non-inverted signal.

Similarly, a synchronous detection circuit including an offset signal input unit may be used as the synchronous detector circuit 321 of the angular velocity component extraction unit 32.

The angular velocity detection circuit 5 according to this embodiment may further include an own failure determination unit 338 for determining whether there is a failure in the angular velocity detection apparatus 1, on the basis of the output signal Vout1 of the offset addition unit 342. If the output signal Vout1 of the offset addition unit 342 exceeds the upper limit reference value or falls below the lower limit reference value, the own failure determination unit 338 determines that there is a failure in the resonator 10 and outputs an output signal based on the determination result. In the circuit block diagram shown in FIG. 1, an output signal is outputted from the angular velocity detection apparatus 1 via an output terminal 341. By incorporating the own failure determination unit 338 into the angular velocity detection circuit 5, the angular velocity detection apparatus 1 itself is allowed to determine whether there is a failure in the resonator 10.

Figure 5:
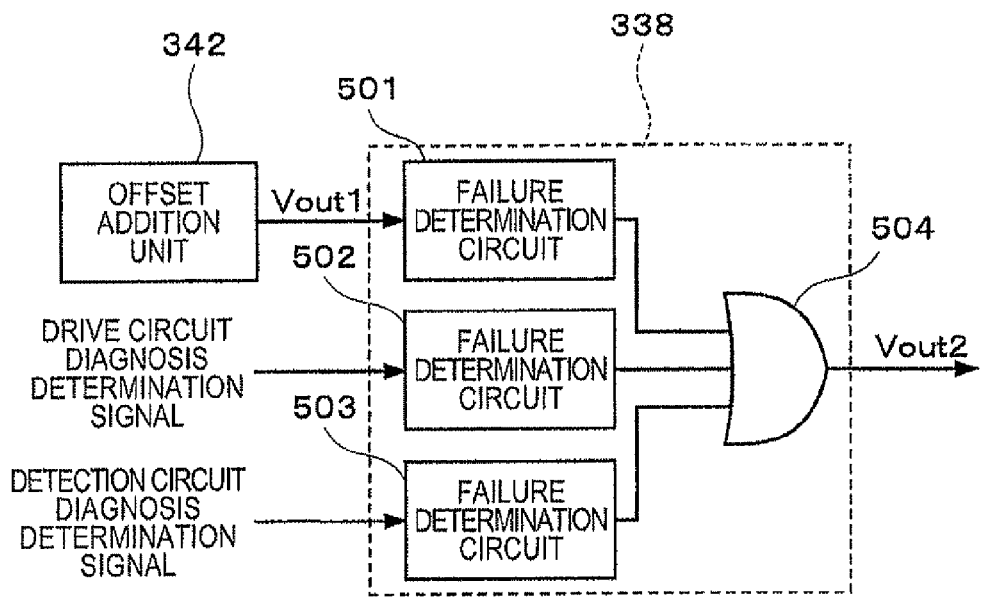
FIG. 5 is a circuit block diagram showing an example of an own failure determination unit having multiple failure determination functions.

The own failure determination unit 338 may have additional failure determination functions using other failure determination signals. FIG. 5 is a circuit block diagram showing an example of the own failure determination unit 338 having multiple failure determination functions. In an example shown in FIG. 5, the own failure determination unit 338 receives a drive circuit diagnosis determination signal used when determining whether there is a failure in the drive circuit 20 and a detection circuit diagnosis determination signal used when determining whether there is a failure in the detection circuit 30 in addition to the output signal Vout1 of the offset addition unit 342 used when determining whether there is a failure in the resonator 10.

The own failure determination unit 338 shown in FIG. 5 includes failure determination circuits 501 to 503 and an OR circuit 504. When any of the failure determination circuits 501 to 503 determines that there is a failure, on the basis of an input signal thereof, the failure determination circuit outputs a high-level output signal. When the failure determination circuits 501 to 503 each determines that there is no failure, they output a low-level output signal.

When the output signal Vout1 of the offset addition unit 342 exceeds the upper limit reference value or falls below the lower limit reference value, the failure determination circuit 501 determines that there is a failure in the resonator 10 and outputs an output signal based on the determination result, to the OR circuit 504. When the drive circuit diagnosis determination signal exceeds the upper limit reference value or falls below the lower limit reference value, the failure determination circuit 502 determines that there is a failure in the drive circuit 20 and outputs an output signal based on the determination result, to the OR circuit 504. When the detection circuit diagnosis determination signal exceeds the upper limit reference value or falls below the lower limit reference value, the failure determination circuit 503 determines that there is a failure in the detection circuit 30 and outputs an output signal based on the determination result, to the OR circuit 504.

When the OR circuit 504 receives a high-level output signal of any of the failure determination circuits 501 to 503, it outputs a high-level output signal Vout2. When the OR circuit 504 receives a low-level output signal of any of the failure determination circuits 501 to 503, it outputs a low-level output signal Vout2.

As seen above, if the own failure determination unit 338 is configured as shown in the block diagram of FIG. 5, it determines whether there is a failure anywhere of the angular velocity detection apparatus 1 and outputs the determination result as the output voltage Vout2.

In the direct-current conversion unit 332 of the angular velocity detection circuit 5 according to this embodiment, the AC amplifier 343 provided before the integrator circuit 336 functioning as an integration unit or the DC amplifier 339 provided thereafter may include an amplification unit that amplifies or attenuates a signal at a desired magnification. In the circuit block diagram shown in FIG. 1, the DC amplifier 339 provided after the integrator circuit 336 functions as such an amplification unit.

The magnitude of a self-vibration component based on excited vibration of the resonator 10 varies with the failure mode of the resonator 10. For example, a variation in a self-vibration component based on excited vibration of the resonator 10 at the time when the resonator 10 is broken is larger than a variation in a self-vibration component based on excited-vibration of the resonator 10 at the time when a foreign substance is stuck on the resonator 10.

If the AC amplifier 343 is provided before the integrator circuit 336 or the DC amplifier 339 is provided thereafter, the output sensitivity of the direct-current conversion unit 332 is changed by changing the gain of the DC amplifier 339. Therefore, a failure determination corresponding to a failure mode desired to be detected is made by setting the gain of the DC amplifier 339 in accordance with the failure mode.

Also, a gain control circuit for controlling the gain of the DC amplifier 339 may be provided as a temperature characteristic compensation unit. In this case, the dependence of an output of the DC amplifier 339 on the temperature is reduced.

The angular velocity detection circuit 5 according to this embodiment may include an output terminal 340 for outputting the output signal Vout1 of the offset addition unit 342. By outputting the output signal Vout1 of the offset addition unit 342 from the angular velocity detection circuit 5, a more detailed failure determination can be made outside the angular velocity detection apparatus 1. For example, if a complicated calculation process that cannot be performed inside the angular velocity detection apparatus 1 due to limitations such as the size of the angular velocity detection apparatus 1 is performed using a microcomputer or the like provided outside the angular velocity detection apparatus 1, a more detailed failure determination can be made.

Also, the output terminal 340 may be used to measure an output voltage of the offset addition unit 342 in the step of inspecting the angular velocity detection apparatus 1.

4. Failure Determination System

Figure 6:
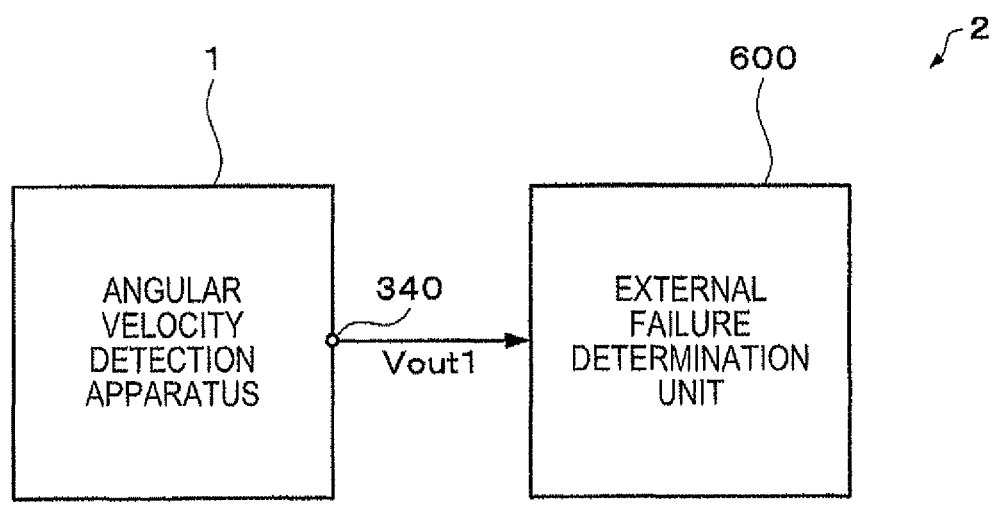
FIG. 6 is a circuit block diagram showing an example of a failure determination system according to this embodiment.

FIG. 6 is a circuit block diagram showing an example of a failure determination system according to this embodiment.

A failure determination system 2 according to this embodiment includes the angular velocity detection apparatus 1. Since the configuration and operations of the angular velocity detection apparatus 1 are as described above with reference to FIGS. 1 to 5, same elements are assigned same reference numerals and will not be described in detail.

The failure determination system 2 according to this embodiment includes an external failure determination unit 600 for judging whether there is a failure in the angular velocity detection apparatus 1, on the basis of the output signal Vout1 from the output terminal 340 of the angular velocity detection apparatus 1. The external failure determination unit 600 may be formed, for example, by a microcomputer.

For example, when the output signal Vout1 of the angular velocity detection apparatus 1 exceeds the upper limit reference value or falls below the lower limit reference value, the external failure determination unit 600 may determine that there is a failure in the resonator 10 of the angular velocity detection apparatus 1. Also, for example, the external failure determination unit 600 may makes a more detailed failure determination by performing a complicated calculation process that cannot be performed inside the angular velocity detection apparatus 1 due to limitations such as the size of the angular velocity detection apparatus 1.

The invention is not limited to the above-mentioned embodiment and various modifications can be made without departing from the spirit and scope of the invention.

The invention includes configurations (for example, configurations identical in function, method, and result and configurations identical in object and advantage) substantially identical to the configuration in the above-mentioned embodiment. Also, the invention includes configurations where non-substantial portions of the elements described in the above-mentioned embodiment are replaced. Also, the invention includes configurations having advantages identical to those of the configuration described in the above-mentioned embodiment and configurations that can achieve the object identical to that of the configuration described in the above-mentioned embodiment. Also, the invention includes configurations where known technology is added to the configuration described in the above-mentioned embodiment.

What is claimed is:

1. A circuit for use in a physical quantity detection device, comprising:
    a self-vibration component extraction unit that receives, from a resonator, a signal that includes (i) a first component corresponding to a magnitude of a physical quantity, and (ii) a second component based on an excited vibration, the self-vibration component extraction unit extracting the second component from the signal;
    a direct-current conversion unit that includes an integration unit that integrates an output signal of the self-vibration component extraction unit;
    an offset addition unit that adds an offset value to an output signal of the direct-current conversion unit; and
    a determination unit that monitors and determines the output signal of the offset addition unit or the direct-current conversion unit.

2. The circuit for use in a physical quantity detection device according to claim 1, further comprising:
    a storage unit that stores the offset value, wherein
    the offset addition unit adds the offset value that was stored in the storage unit to an output signal of the direct-current conversion unit.

3. The circuit for use in a physical quantity detection device according to claim 1, further comprising:
    a temperature characteristic compensation unit that compensates for variations due to a temperature in an output signal of the direct-current conversion unit.

4. The circuit for use in a physical quantity detection device according to claim 1, the resonator comprising:
    a coupling arm that extends from a detection base portion;
    a drive resonator element that extends from a driving base portion, the driving base portion arranged on the coupling arm and in a direction that intersects the direction in which the coupling arm extends; and
    a detection resonator element that extends from the detection base portion in a direction that intersects the direction in which the coupling arm extends.

5. A circuit for use in a physical quantity detection device, comprising:
    a self-vibration component extraction unit that receives, from a resonator, a signal that includes (i) a first component corresponding to a magnitude of a physical quantity, and (ii) a second component based on an excited vibration, the self-vibration component extraction unit extracting the second component from the signal, and
    an offset addition unit that adds an offset value to an output signal of the self-vibration component extraction conversion unit.

6. The circuit for use in a physical quantity detection device according to claim 5, the self-vibration component extraction unit further comprising:
    an inverting unit that (i) receives a synchronized detection signal, the synchronized detection signal branched into a first synchronized detection signal and a second synchronized detection signal, (ii) inverts the first synchronized detection signal into an inverted signal, and (iii) outputs the inverted signal; and
    a switch that alternately selects and outputs a second synchronized detection signal and the inverted signal, wherein
    the offset value is added to either the second synchronized detection signal or the inverted signal.

7. The circuit for use in a physical quantity detection device according to claim 5, further comprising:
    a temperature characteristic compensation unit that compensates for variations due to a temperature in an output signal of the self-vibration component extraction unit.

8. The circuit for use in a physical quantity detection device according to claim 5, wherein the resonator comprises:

a coupling arm that extends from a detection base portion;
a drive resonator element that extends from a driving base portion arranged on the coupling arm and in a direction that intersects the direction in which the coupling arm extends; and
a detection resonator element that extends from the detection base portion in a direction that intersects the direction in which the coupling arm extends.

9. The circuit for use in a physical quantity detection device according to claim 5 further comprising:
a determination unit that monitors and determines an output signal of the offset addition unit.

10. A physical quantity detection device, comprising:
a resonator that generates a signal that includes (i) a first component corresponding to a magnitude of the physical quantity, and (ii) a second component based on an excited vibration;
a self-vibration component extraction unit that receives the signal and extracts the second component from the signal;
a direct-current conversion unit that includes an integration unit that integrates an output signal of the self-vibration component extraction unit;
an offset addition unit that adds an offset value to an output signal of the direct-current conversion unit; and
a determination unit that monitors and determines an output signal of the offset addition unit or the direct-current conversion unit.

11. The physical quantity detection device according to claim 10, further comprising:
a storage unit that stores the offset value, wherein
the offset addition unit adds the offset value stored by the storage unit to an output signal of the direct-current conversion unit.

12. The physical quantity detection device according to claim 10, further comprising:
a temperature characteristic compensation unit that compensates for variations due to a temperature in an output signal of the direct-current conversion unit.

13. The physical quantity detection device according to claim 10, the resonator comprising:
a coupling arm that extends from a detection base portion;
a drive resonator element that extends from a driving base portion, the driving base portion arranged on the coupling arm and in a direction that intersects the direction in which the coupling arm extends; and
a detection resonator element that extends from the detection base portion in a direction that intersects the direction in which the coupling arm extends.

14. A failure determination system, comprising:
the physical quantity detection device according to claim 10; and
an external failure determination unit that receives and monitors an output signal of the offset addition unit.

15. A physical quantity detection device, comprising:
a resonator that generates a signal that includes (i) a first component corresponding to a magnitude of a physical quantity and (ii) a second component based on an excited vibration;
a self-vibration component extraction unit that receives the signal and extracts the second component from the signal; and
an offset addition unit which adds an offset value to an output signal of the self-vibration component extraction unit.

16. The physical quantity detection device according to claim 15, the self-vibration component extraction unit comprising:
an inverting unit that (i) receives a synchronized detection signal, the synchronized detection signal branched into a first synchronized detection signal and a second synchronized detection signal, (ii) inverts the first synchronized detection signal into an inverted signal, and (iii) outputs the inverted signal; and
a switch that alternately selects and outputs the second synchronized detection signal and the inverted signal, wherein
the offset value is added to either the second synchronized detection signal or the inverted signal.

17. The physical quantity detection device according to claim 15, further comprising:
a temperature characteristic compensation unit that compensates for variations due to a temperature in an output signal of the self-vibration extraction unit.

18. The physical quantity detection device according to claim 15, the resonator comprising:
a coupling arm that extends from a detection base portion;
a drive resonator element that extends from a driving base portion, the driving base portion arranged on the coupling arm and in a direction that intersects the direction in which the coupling arm extends; and
a detection resonator element that extends from the detection base portion in a direction that intersects the direction in which the coupling arm extends.

19. The physical quantity detection device according to claim 15, further comprising:
a determination unit that monitors and determines an output signal of the offset addition unit.

20. A failure determination system, comprising:
the physical quantity detection device according to claim 15; and
an external failure determination unit that receives and monitors an output signal of the offset addition unit.

* * * * *